United States Patent

[11] 3,622,001

[72] Inventor William A. Oden
 Temple City, Calif.
[21] Appl. No. 857,367
[22] Filed Sept. 12, 1969
[45] Patented Nov. 23, 1971
[73] Assignee Domain Industries, Inc.
 New Richmond, Wis.

[54] SYSTEM AND DEVICE FOR VISUALLY INDICATING THE DEGREE OF CONTAMINATION OF THE FILTER MEDIA IN FILTRATION APPARATUS
 4 Claims, 4 Drawing Figs.

[52] U.S. Cl. .................................. 210/90,
  210/95, 210/169, 210/130, 210/333
[51] Int. Cl. .................................. B01d 27/10,
  B01d 29/34
[50] Field of Search ........................... 210/90, 93,
  169, 91, 95, 333

[56] References Cited
UNITED STATES PATENTS

| | | | |
|---|---|---|---|
| 2,809,248 | 10/1957 | Frakes | 210/90 X |
| 2,935,040 | 5/1960 | Steensen | 210/90 X |
| 3,252,575 | 5/1966 | Jacuzzi | 210/169 X |
| 3,358,836 | 12/1967 | Schmitt | 210/90 |

Primary Examiner—Samih N. Zaharna
Attorney—Williamson, Palmatier & Bains

ABSTRACT: This device provides a visual media for instantly determining the then-filtering capacity of the filter elements or media in a water filtration apparatus. The system includes a bypass channel or chamber disposed in an upstanding position and having freely and slidably mounted therein a movable indicator element having a specific gravity somewhat above that of water. This bypass channel or chamber is connected at its lower end with the liquid or water in a filter tank, which is subjected to pressure imposed by a recirculating pump, and the upper end of said bypass is in communication with the liquid pressure passing through from the collection manifold of the filter apparatus to the return line to the pool or other main repository for the water. When the filter media is in a clean or new condition, the pressure from the upper connection of the bypass will be slightly less than from the tank or bottom connection, and as the filter media becomes impregnated or contaminated or clogged, the collection manifold pressure due to the decline of water flow decreases further while simultaneously the pressure at the lower end of the bypass from the filter tank increases. This differential pressure is responsible for an upwardly escape velocity in the bypass chamber, causing the indicator element proper to rise in a direct relationship to the degree of contamination or clogging.

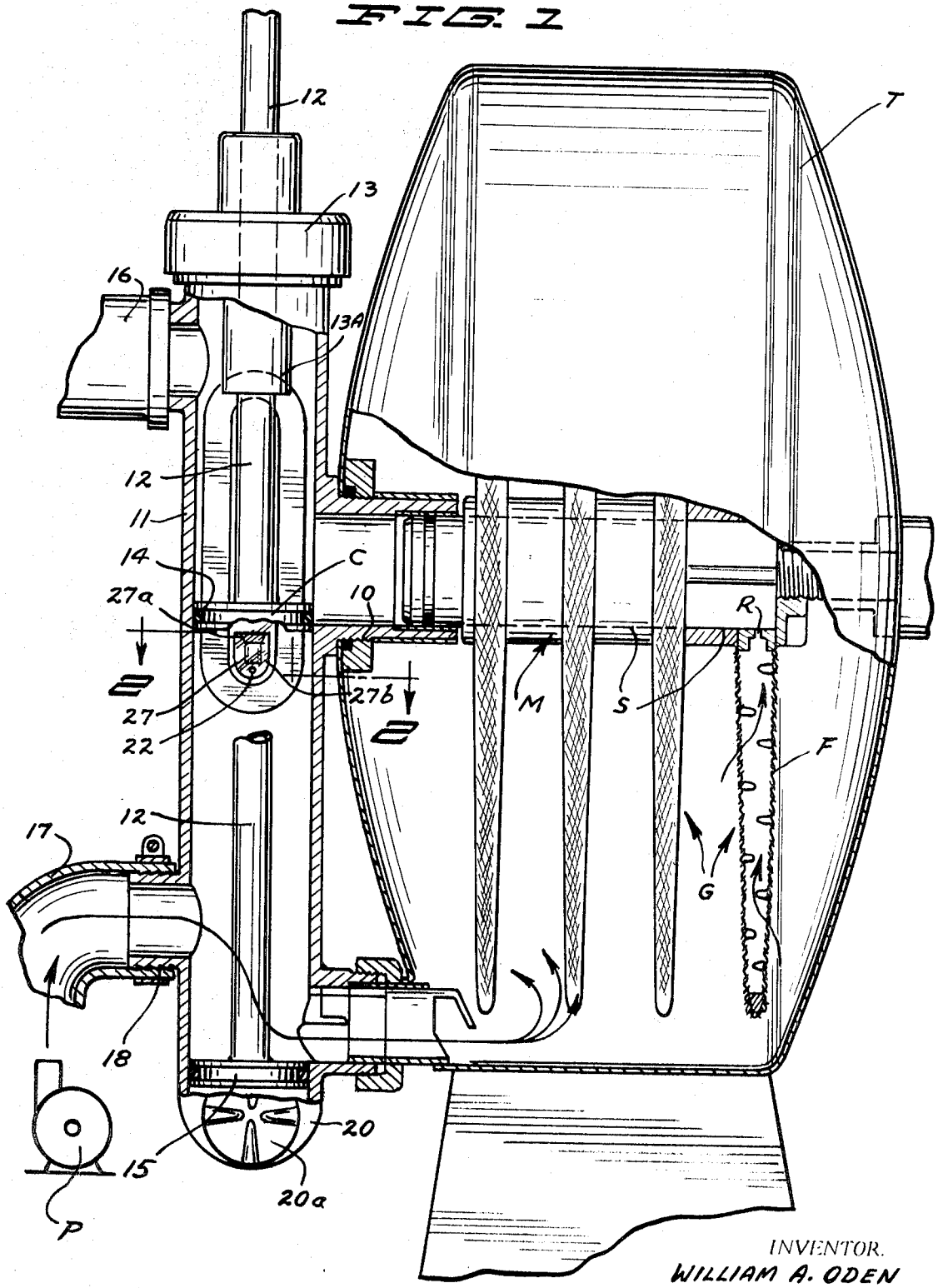

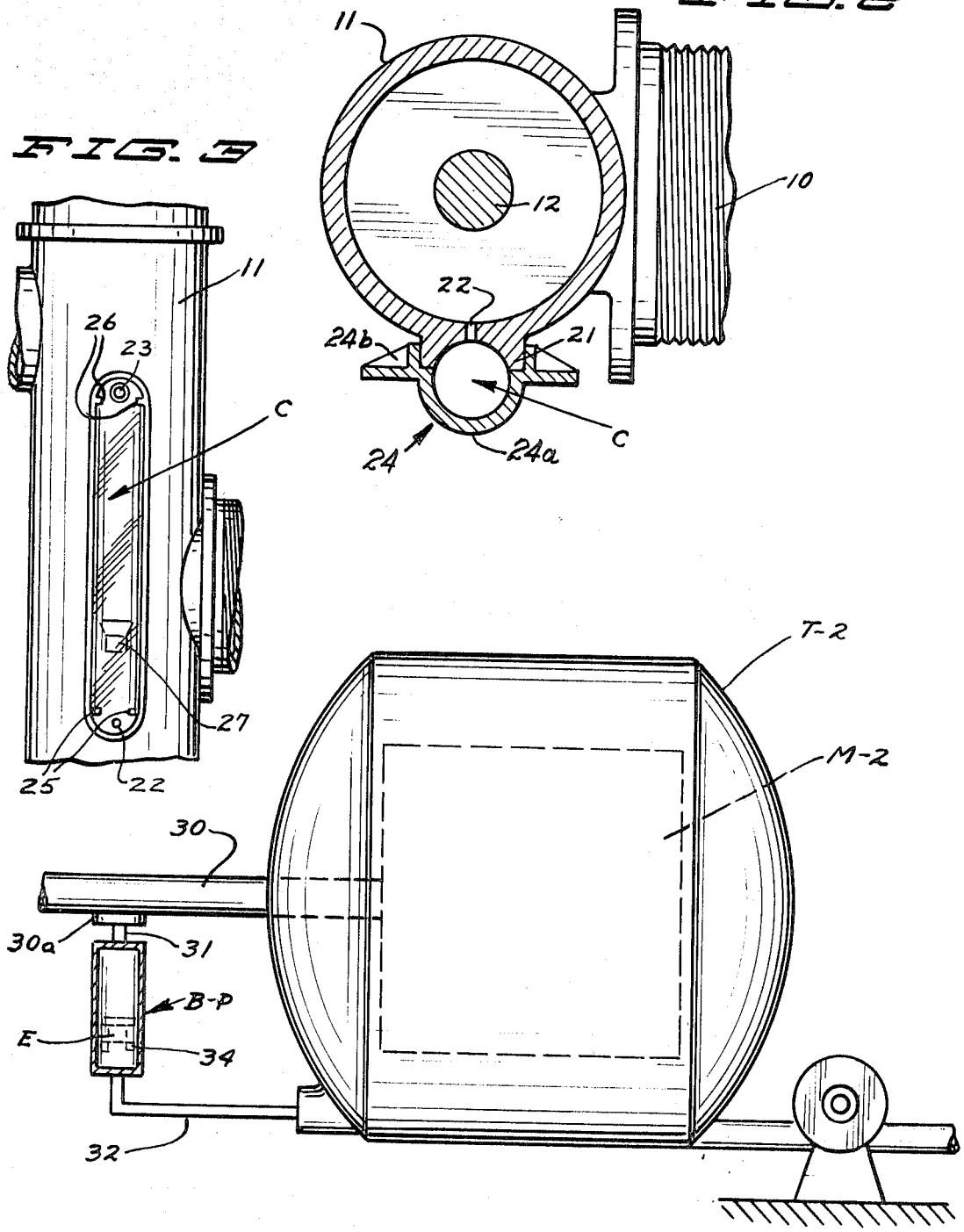

SYSTEM AND DEVICE FOR VISUALLY INDICATING THE DEGREE OF CONTAMINATION OF THE FILTER MEDIA IN FILTRATION APPARATUS

This invention relates to a device or system for indicating the degree of contamination of the filter media employed in water or other liquid filtration equipment. Liquid filtration apparatus employing diatomaceous earth in conjunction with a plurality of coaxially mounted and closely spaced filter grids internally communicating with an axial elongate manifold and externally communicating with the water or liquid of a tank are commonly used in filtration apparatus employed in swimming pools and in various other tanks and large containers wherein the contents are subjected to dirt, dust and other water-contaminating elements.

It is an object of my present invention to provide a visual device and system whereby an attendant may instantly determine the filtering capacity of the filter media or grids, thereby informing the attendant of the need or lack of need for replacement or cleaning of the same. In my invention the indicator element is movable in accordance with a differential pressure which is responsive to the pressure on liquid returning to the pool or other container from the normal discharge of the manifold and its relation with the pressure created by a pump or the like within the tank wherein the filter grids are mounted.

More specifically, it is an object of my invention to provide, in conjunction with liquid filter apparatus of the class described, a bypass tube or housing, one end of which is in direct connection with an orifice connected with the return water or liquid from the manifold of the filter device, and the opposite and lower end of which is in direct communication with the water or liquid within the tank and which surrounds the filter elements. A shiftable and freely slidable indicating element of small size and having a specific gravity of somewhat greater than water or the liquid serviced is slidably disposed within the bypass chamber or tube and will, through gravity, remain at the bottom of the bypass when the filter media employed is in a clean or new condition. As the filter media becomes contaminated by impregnation or blockage, the collection or return manifold pressure due to the decline of water flow decreases. Simultaneously, the filter tank pressure due to the continuing operation of the recirculating pump increases. Thus a differential pressure is created, resulting in flow of liquid upwardly towards the connection with the flow from the collection manifold. In other words, increasing differential pressure creates an escape velocity (upwardly) inside the bypass chamber or tube, which in the procedure overcomes the effect of gravity on the primary indicator element, so that this element rises in a direct relationship to the degree of contamination in or on the filter media. The precise positioning of the movable indicator element may be viewed through a lens or glass covering, disposed vertically of the bypass chamber.

Through my knowledge of the prior art, only two attempts have been made to indicate the filtering capacity or contamination of water filter systems of the class herein described.

The first structure has employed merely a conventional pressure gauge mounted usually at the top of the water tank wherein the filter grids are mounted and responsive to the pressure at the top of the tank. The buildup of pressure per se has proved inaccurate, although of showing some trend towards contamination of the filter medium, but variations in pressure are common from other conditions of the general system including restrictions or valving in the return line or collection manifolds as well as in the sizing or diameter of lines employed.

The second structure which has been used to some extent is an ordinary flow meter for interrupting and measuring the volume of water being passed from the collection manifold back to the pool or other main source of water. Here again the slight variation per se has proven inadequate and inaccurate due to the many factors previously recited which can affect rate of flow.

My invention employs the wide ranging differential pressures which inherently take place between return flow of water from the manifold and increase in the buildup where such differential pressures are not adversely affected by variances in valving, line diameters and the like.

A still further object of the invention is to provide an indicator system of the class described which may be incorporated in a separate bypass mounted upon the exterior of the filter tank or which may be actually incorporated in the conventional backwash valve body assembly with suitable connections and communications.

The foregoing objects and advantages of this invention will be more apparent from the following description made in connection with the accompanying drawings wherein like reference characters refer to similar parts throughout the several views and in which:

FIG. 1 is a view partly in side elevation and partly in vertical section through a portion of the back valve casing and valve construction and the interior of a conventional water tank with filter grids and conventional manifold employed therein;

FIG. 2 is a cross section taken on the line 2—2 of FIG. 1 showing conversion and application of one form of my device to the conventional collector return and back valve cylinder for application of the principles of my invention;

FIG. 3 is a side elevation of the upper portion of a conventional backwash valve casing having an embodiment of the invention incorporated therein; and FIG. 4 is a diagrammatic view, with some portions broken away, showing another embodiment of the invention where a small independent bypass chamber is employed in a conventional water-filtering tank employing diatomaceous earth in conjunction with spaced filter grids and an axial manifold.

Referring now in detail to the form of the invention disclosed in FIGS. 1 and 2, a conventional type of filter tank T is illustrated, the lower portion of which is shown in cross section, having mounted therein the horizontally disposed manifold M which interconnects a plurality of spaced grids G, of conventional type, each having applied to the faces thereof a waterporous filter fabric F, as shown in the right-hand grid of FIG. 1. The grids G are spaced apart on the manifold by spacer rings S in conventional manner, and each grid communicates with the interior of the manifold through a plurality of radial ports R.

The outlet end of the manifold M communicates and is connected with a central horizontal sleeve 10 which, as shown, is integrally formed with a vertical cylindrical backwash valve casing 11, of conventional type. Valve casing 11 is capped at it upper end by a threaded upstanding cap 13, which has a central depending supporting sleeve 13a having slidably connected and sealed therewith an elongate backwash valve plunger 12 which extends the full length of valve casing 11 and is longitudinally shiftable in cap 13. Valve plunger 12 at its intermediate portion carries a piston valve 14 which, as shown in the drawings, is positioned in a lowered predetermined position to close off the bottom of the valve casing and permit effluent flow of water from the manifold upwardly into a return fitting or sleeve 16 which communicates by pipeline to the pool or other main source of water or liquid.

The lower end of valve plunger 12 conventionally carries a backwash piston valve 15 which, as shown in its lowermost position, permits normal-filtering flow of water by action of a large pump P rearwardly through the bottom portion of the tank, as indicated by the arrows, and thereafter normally through the filter fabric and grids into the manifold.

The water drawn from the pool into the tank enters normally through a conduit 17 which is connected with an entrance sleeve 18 disposed at the forward and lower portion of the vertical valve casing 11. A forward transverse sump 20 is provided in conventional manner below the forward portion of the tank T having at one end thereof a drain exit 20a for removal of sludge and waste in the system.

As an important essential of this invention, an upstanding differential pressure flow chamber, indicated as an entirety by the letter C, is required, having its lower end properly communicating with the lower portion (in the form shown in FIGS. 1 to 3) of the valve casing 11 for response pressure within the tank and having its upper portion in communication with the flow and pressure of water flowing back to the pool or other main container from the manifold end and through the return line 16. As shown in FIGS. 1 through 3 of the drawings, an elongate portion of the periphery of the vertical valve casing 11 is shallowly recessed or formed to constitute the backwall and sidewall portions of chamber C. As shown, an elongate oval-shaped continuous rib 21 is protruded from the intermediate portion of cylindrical casing 11, extending at its lower end some distance below the lowered position of the intermediate piston valve 14 and having communication with the interior of the lower portion of valve casing 11 through a small orifice port 22 of a predetermined diameter. Near the upper end of continuous rib 21 a second orifice port 23 is formed, usually of somewhat larger diameter than orifice 22, and communicating with the interior of the vertical valve housing 11 at a level above the communication area of the effluent flow from manifold M into the upper portion of the casing 11.

Cooperating with the continuous rib 21 is an elongate shell member 24, of similar shape but larger dimensions than the continuous rib 21, constructed of a suitable hard material and preferably transparent throughout, such as polycarbonate. Shell 24 has a distended elongate body 24a which cooperates with oval rib 21 and the periphery of the casing 11 defined and enclosed by the rib to form a generally tubular upstanding bypass chamber. The shell has a continuous outturned elongated oval attachment flange 24b which overlaps and seals with the oval rib 21, it being understood that the top surface of rib 21 and the bottom surface of lip 24b are planar and that suitable bonding, welding or sealing material is employed to make a seal joint between the shell and its cooperating elongate recess defined by rib 21. A pair of spaced abutment lugs 25 is affixed to appropriate portions of the casing 11 or may be provided in molding of the shell disposed a short distance within the confines of chamber C above the lower inlet port or orifice 22. Similarly, a second pair of abutment lugs 26 is provided within the confines of shell body 24a in spaced relation just below the communication port 23.

A longitudinally slidable indicator plug 27, as shown of mushroom-shape, is slidably disposed within chamber C and in the form shown has a flared upper guidehead 27a of slightly smaller peripheral dimension than the interior cross-sectional dimension of chamber C, and having a diminished cylindrical lower portion 27b of solid form and of a diameter somewhat greater than the space between abutment lugs 25. The indicator plug 27 is made of a material such as stainless steel, brass, plastic or composition having a specific gravity greater than water to the end that when the filtering operation of the system is functioning normally, without undue clogging of the media or the pores of the fabric on the filter grids or with serious contamination in tank T, plug 27, through gravity, will remain in normal position resting upon the lower abutment lugs 25.

OPERATION

In the filtering operation of the apparatus with the intermediate piston valve 14 disposed in its lowered position, as shown in full lines in FIG. 1, and with the lower backwash control valve being in its lowered position, as shown in full lines, water will be drawn through the action of the pump P through conduit 17 and entrance sleeve 18 into the lower portion of the tank and will flow and circulate between the grids and in impingement with the grids as indicated by the heavy arrows, as shown. Dirt and pulverulent material carried by the circulating water will be filtered off through the porous filter fabrics, or other media, F and the cleansed water will flow through the grid structure under tank pressure and flow through the radial ports R into the manifold M. Thereafter, effluent flow will pass forwardly out of the manifold through the heavy lateral sleeve 10 and into the upper portion of upright valve casing 11 and then back to the swimming pool or other main container through the outlet sleeve 16 and pipe connections.

During proper filtering operation, the pressure within tank T is communicated through the bypass flow chamber C through the orifice port 22 which communicates, it will be noted, at a point considerably below the lowered position of the valve 14 in tubular casing 11. Simultaneously, the pressure from the effluent flow of liquid out of the manifold M and above the closed valve 14 is communicated to the uppermost portion of chamber C through the orifice port 23. Thus the chamber C is full of liquid and little flow thereof will take place until a differential pressure is built up to the extent where the pressure from the effluent flow falls below that of the pressure from the tank.

As the filters become clogged or contamination is considerable within tank T, the pressure due to the constantly operating pump M in the tank increases and simultaneously the effluent flow of liquid from the manifold M decreases and pressure decreases. The differential pressure produces an escape pressure within the liquid contained in chamber C and the indicator plug 27 is affected by this escape differential flow continuing to rise as the differential pressure is increased. The precise position of the indicator plug 27 may be instantly observed and it is, of course, contemplated that graduations may be calibrated upon the forward longitudinal face of the shell 24 to indicate the degree of contamination or clogging of the filtering system.

Since the movement of the indicator plug 27 is predicated on differential pressure between that of the effluent water from the manifold and the pressure within the tank T due to pump action on grid surfaces which are becoming clogged, my system is not dependent on pipeline diameters, valve surfaces or other elements, since these are involved in the general circulation of the system before the bypass is installed.

Thus a very accurate reading may be visually determined immediately at all times during filtering operation of the apparatus, and when the indicating plug 27 rises through escape upward flow of the water contained in chamber C to a predetermined point, the backwash and other cleaning and cleansing operations of the system may be entered into and additional diatomaceous earth may be supplied as needed, or permanent media such as sand may be cleaned for reuse.

From the foregoing description it will be seen that the novel and valuable indicating system may, in one form of the invention, be readily integrated with the conventional upstanding casing for a backwash valve of conventional filtering systems for swimming pools and the like. This application of the invention requires only a few additional parts and employs as a support and backing for the differential pressure passage, a selected portion only of the periphery of the backwash valve cylinder and communicating ports or passages at proper levels to obtain the responsive pressures required.

It should be clearly understood that my system and apparatus invention applies to substantially all types of water or other liquid filtration systems wherein sand, charcoal, cartridge, including paper or cloth, and filters and diatomaceous earth are employed.

Referring now to the form of the invention illustrated in FIG. 4, which is diagrammatical illustration, the invention is shown as capable of wide application to a number of types of filter tanks and systems whether or not they employ an upstanding backwash valve casing with valves disposed appropriately for employment of the invention in the form first described and illustrated.

In FIG. 4, an enlarged water tank T-2 is illustrated having, as shown in dotted lines, a plurality of conventional filter grids mounted therein and spaced apart about an axial manifold M-2. The effluent flow from collection manifold M-2 passes through a pipeline 30 which, in normal use of the device, returns the cleansed water back to the swimming pool or main liquid container.

An upstanding vertical bypass chamber B-P is provided below a portion of the large return line 30 and, as shown, is of general cylindrical cross section. The top of this chamber B-P communicates with and is subjected to the pressure of the water or other liquid returning through the line 30 by means of a suitable orifice 30a which is connected by a sharp short sleeve 31 with the topmost part of the chamber B-P.

A relatively small conduit 32 communicates with an orifice 32a in the bottom portion of the tank T-2, such orifice or port having communication with the water subjected to pressure in the confines of the tank through the action of pump P. The conduit 32 communicates at its outer end with the bottom of the chamber B-P, thus subjecting chamber B-P to the responsive pressure from the bottom of the filtration tank.

A longitudinally slidable plug-type indicator element E is slidably disposed in the confines of the cylindrical chamber B-P and is of similar structure to the indicator element first described in this specification, being constructed of a solid material having a specific gravity somewhat greater than water.

Spaced abutment lugs 34, similar to the lower abutment lugs of the first form of the invention, are supplied, being disposed in spaced relation a slight distance above the bottom of chamber B-P.

The very general application of the indicating system just described can be made in conjunction with any conventional type of water or liquid-filtering apparatus employing the grids and a collection manifold or effluent flowback conduit to the pool or main reservoir, and provided of course a pump or analogous device is employed for moving water from the pool or main reservoir into tank T-2 exteriorly of the filter grids G. The system is equally applicable to filtering apparatus employing sand, charcoal and the like in place of grids.

The operation of the second described form of the invention, and it is pointed out that the variance in bypass flow through the chamber B-P with escape flow through a pressure differential is directly responsive and indicates the filtering capacity of the filter media employed and extent of contamination or clogging thereof.

It will be understood that in selecting the plug indicator element and determining specific gravity thereof, the general relationship including the size of the orifices 22 and 23 must be taken into consideration. Thus, for some systems metals as heavy as stainless steel and aluminum may be employed, while in others solid plastics having specific gravities not over 150 may work successfully.

I claim:

1. In filtering apparatus employing a liquid filter tank having immersed therein filter media having inlet and outlet sides, an effluent manifold operatively connected with the outlet side, means including a pump for removing water from a main liquid reservoir into the tank and for also causing filtered water to leave the tank in a return flow through said manifold, a system for visually indicating the degree of contamination and clogging of the filter media comprising, an upstanding bypass chamber having closed lower end a first passage communicating the lower end of the bypass chamber with the interior of the filter tank at the inlet side of the filter media, whereby pressure communication responsive to the pressure within the tank and externally of the filter media is always provided, said bypass chamber having a closed upper end and a second passage operatively connecting said upper end with effluent manifold and return line to the main liquid reservoir, said chamber having a transparent elongate viewing wall extending through the greater part of the length thereof, indicator abutment elements within said bypass chamber disposed respectively below and above the first and second passages and adjacent the lower and upper ends of said chamber, and a current-responsive indicator element constructed of a material having greater specific gravity than water loosely disposed within the interior of said chamber between said abutment elements, said indicator element being constructed and arranged so that upon clogging of the filter media and increase of pressure differential thereacross, water flows around said indicator element from said first passage to said second passage thereby bypassing said filter media while simultaneously moving said indicator element upwardly to indicate the clogging condition of the filter media.

2. The structure in combination as set forth in claim 1 wherein said filtering apparatus further employs a backwash valve assembly having an upstanding tubular valve casing with a movable valve assembly therein for simultaneously cutting off communication between the upper portion of said casing and the effluent flow of liquid from said manifold and communication of liquid from the lower portion of said casing into said tank, said bypass chamber being mounted upon a medial portion of said upstanding backwash casing and having a communication near the lower part of said bypass chamber to the interior of said casing below the cutoff valve, and having a communication passage near the upper portion of said chamber with the interior of said casing above said cutoff and communicating with the effluent water-conducting medium.

3. The structure as set forth in claim 2 wherein the rear portion of said bypass chamber is provided by an exterior wall portion of said valve casing and wherein the opposite side of said closed chamber is provided by a shell member having sealed attachment with said portion of said valve casing and having a central transparent and longitudinal portion through which the position of said indicator element may be viewed.

4. The structure and combination as set forth in claim 1 wherein said filtering apparatus employs a plurality of coaxial filter grid elements communicating internally with said axial manifold and wherein said pump in normal filtering operation delivers liquid under pressure into said tank externally of said filter grids.

* * * * *